(12) United States Patent
Stillabower

(10) Patent No.: US 8,360,405 B2
(45) Date of Patent: Jan. 29, 2013

(54) MOUNTING APPARATUS FOR A VIBRATION-SENSITIVE MODULE

(75) Inventor: Morris D. Stillabower, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 1637 days.

(21) Appl. No.: 11/434,947

(22) Filed: May 16, 2006

(65) Prior Publication Data

US 2007/0278724 A1 Dec. 6, 2007

(51) Int. Cl.
*F16F 3/00* (2006.01)

(52) U.S. Cl. .................. 267/141.4; 267/141.5

(58) Field of Classification Search .............. 267/153, 267/220, 140–141.7, 152, 293; 248/609, 248/611, 635, 638
See application file for complete search history.

(56) References Cited

U.S. PATENT DOCUMENTS

| | | | | |
|---|---|---|---|---|
| 3,304,043 A | * | 2/1967 | Beck | 267/140.5 |
| 4,519,467 A | * | 5/1985 | Saunders | 180/68.4 |
| 5,456,454 A | * | 10/1995 | Schulz et al. | 267/293 |
| 6,471,179 B1 | * | 10/2002 | Tousi et al. | 248/635 |

FOREIGN PATENT DOCUMENTS

| | | |
|---|---|---|
| DE | 4319689 | 12/1994 |
| DE | 10340820 | 3/2005 |
| EP | 0058911 | 9/1982 |

* cited by examiner

*Primary Examiner* — Christopher Schwartz
(74) *Attorney, Agent, or Firm* — Lawrence D. Hazelton

(57) ABSTRACT

A vibration-sensitive module having a mounting flange is mounted to a vibrational base with a bushing assembly secured to the base, where the mounting flange has cammed surfaces radially adjacent to the bushing assembly that variably engage the radial peripheries of the bushings in response to vibrational movement of the base. The cammed surfaces produce a desired force vs. deflection characteristic of the mounting apparatus, and the bushing material retains its compressibility under load to minimize cross-coupling of vibrational force impulses.

5 Claims, 3 Drawing Sheets

MOUNTING APPARATUS FOR A VIBRATION-SENSITIVE MODULE

TECHNICAL FIELD

The present invention relates to apparatus for mounting a vibration-sensitive module on a vibrational base such as an internal combustion engine, and more particularly to a mounting geometry that more effectively isolates the module from vibrational movements of the base.

BACKGROUND OF THE INVENTION

When a vibration-sensitive module such as an electronic control unit is mounted on a vibrational base such as an internal combustion engine, elastomeric bushings are interposed between the module and the base to dampen the amount of vibrational energy transmitted from the base to the module. If too much vibrational energy is transmitted to the module, electronic components and solder joints in the module can suffer fatigue failures that degrade the performance of the module or render it inoperative.

FIG. 1 depicts a prior art arrangement for mounting an electronic module on a vibrational base 10. The module housing 12 is typically a cast or stamped metal part, but in some cases may be formed of plastic. In any case, the housing 12 has several integrally formed mounting plates or flanges, one of which is designated in FIG. 1 by the reference numeral 12a. The flange 12a is provided with an internal through-hole 12b for receiving a bushing assembly 14, and a mounting bolt 16 passing through the center of the bushing assembly 14 is threaded into a tapped opening in the vibrational base 10. The bushing assembly 14 includes upper and lower annular rings of elastomeric material (i.e., bushings) 18 and 20, an upper washer 22 disposed between the upper bushing 18 and the head 16a of bolt 16, a lower washer 24 disposed between the lower bushing 20 and the vibrational base 10, and a tubular sleeve 26 disposed about the bolt 16 between the upper and lower washers 22 and 24 that limits the bolt travel and determines the preset compression force applied to bushings 18 and 20. As seen in FIG. 1, the faces of bushings 18 and 20 that seat on the flange 12a are undercut as indicated by the reference numerals 18a and 20a, allowing the bushings 18 and 20 to partially extend into the flange through-hole 12b. This centers the bushings 18 and 20 in the flange through-hole 12b during installation and mounting, and fills part of the through-hole 12b with bushing material that acts to absorb vibrational movement of the base 10 in a direction transverse to bolt 16.

The elastomeric material of bushings 18 and 20 is designed to absorb vibrational movements of the base 10. However, the configuration of bushing assembly 14 places most of the elastomeric material between the flange 12a and the upper and lower washers 22 and 24, and only a small amount of the elastomeric material (i.e., the bushing portions 18a and 20a) within the flange through-hole 12b. Consequently, the bushing assembly 14 exhibits good absorption of vibrational impulses parallel to the longitudinal axis of bolt 16 (referred to herein as z-axis impulses), but only limited absorption of impulses in directions transverse to the z-axis before the inner ring of elastomeric material within the through-hole 12b locally collapses or bottoms-out. When a transverse impulse collapses the bushing material between the flange 12a and the sleeve 26, the bushing assembly 14 can no longer isolate the module 12, and the force transmitted to module 12 from the base 10 rises sharply. Even in a best-case scenario where the vibrational force impulse is predominantly along the z-axis, the elastomeric material of bushings 18 and 20 resonantly couple the vibrational movement into the transverse plane, resulting in transmitted vibrational vectors that can even exceed the z-axis force impulse. Of course vibrational force impulses are rarely unidirectional in nature, and the bushing assembly 14 is frequently incapable of adequately isolating module 12 in the transverse plane.

In view of the above, what is needed is an improved but cost-effective mounting arrangement that more effectively isolates a vibration sensitive module from both z-axis and transverse plane movements of a vibrational base.

SUMMARY OF THE INVENTION

The present invention is directed to an improved vibration isolating mounting apparatus for vibration-sensitive module having a mounting flange sandwiched between axial faces of upper and lower elastomeric bushings that are secured to a vibrational base, where the mounting flange has cammed surfaces radially adjacent to the bushings that variably engages an outer radial periphery of the bushings in response to vibrational movement of the base. The cammed surfaces produce a desired force vs. deflection characteristic of the mounting apparatus, and the bushing material retains its compressibility under load to minimize cross-coupling of vibrational force impulses.

DESCRIPTION OF THE PREFERRED EMBODIMENT

Figure 1:
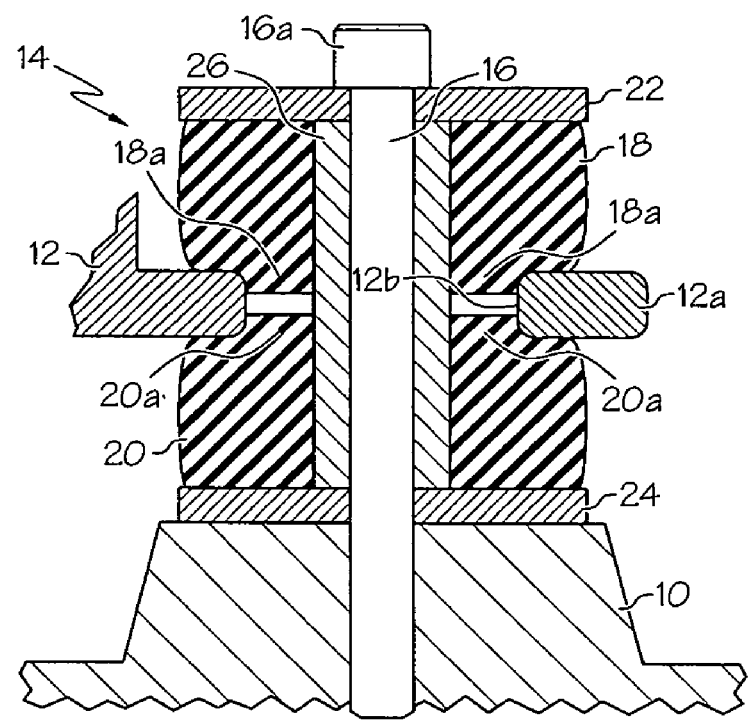
FIG. 1 is a diagram of a prior art mounting apparatus for a vibration-sensitive module including a mounting flange and a bushing assembly for securing the mounting flange to a vibrational base.
Figure 2:
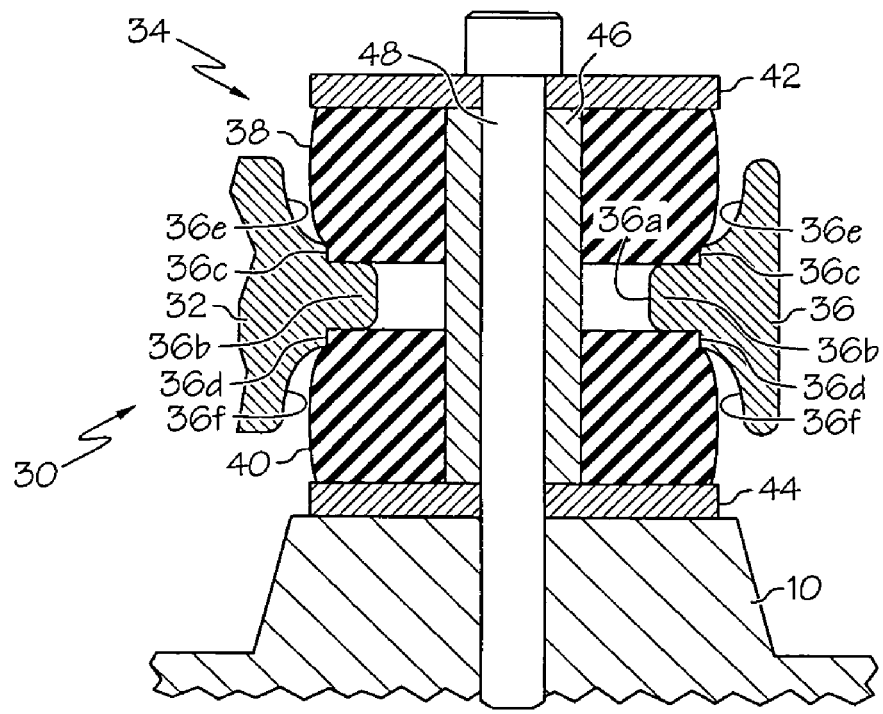
FIG. 2 is a diagram of a mounting apparatus for a vibration-sensitive module according to the present invention.

Referring to FIG. 2, the reference numeral 30 generally designates a mounting apparatus for a vibration-sensitive module 32 according to this invention. The mounting apparatus 30 includes a mostly conventional bushing assembly 34 and a unique module flange 36 having an internal through-hole 36a. Similar to the prior art bushing assembly 14 of FIG. 1, the bushing assembly 34 includes upper and lower annular elastomeric bushings 38 and 40, upper and lower washers 42 and 44, and a tubular sleeve 46 surrounding a mounting bolt 48. The bolt 48, washers 42 and 44, and sleeve 46 are identical to the prior art mounting apparatus depicted in FIG. 1. However, the upper and lower bushings 38 and 40 are not undercut as in the prior art bushing assembly 14. Instead, the bushings 38 and 40 are purely cylindrical in profile, and rest against the annulus 36b of flange 36 bordering through-hole 36a, leaving the core of annulus 36b free of elastomeric material. Preferably, the flange 36 has a pair of small circular shoulders 36c and 36d radially outward of the annulus 36b and extending above and below the annulus 36b to engage the radial periphery of the bushings 38 and 40; this aids in centering the bushings 38 and 40 in the through-hole 36a during installation and mounting. Radially outboard of the annulus 36b and the shoulders 36c and 36d, the upper and lower peripheries of the flange 36 are contoured or cammed as indicated by the reference numerals 36e and 36f. When the bolt 48 is tightened during mounting of the module 12, the bushings 38 and 40 bulge radially as shown, but do not substantially engage the cammed surfaces 36e and 36f of flange 36.

Figure 3:
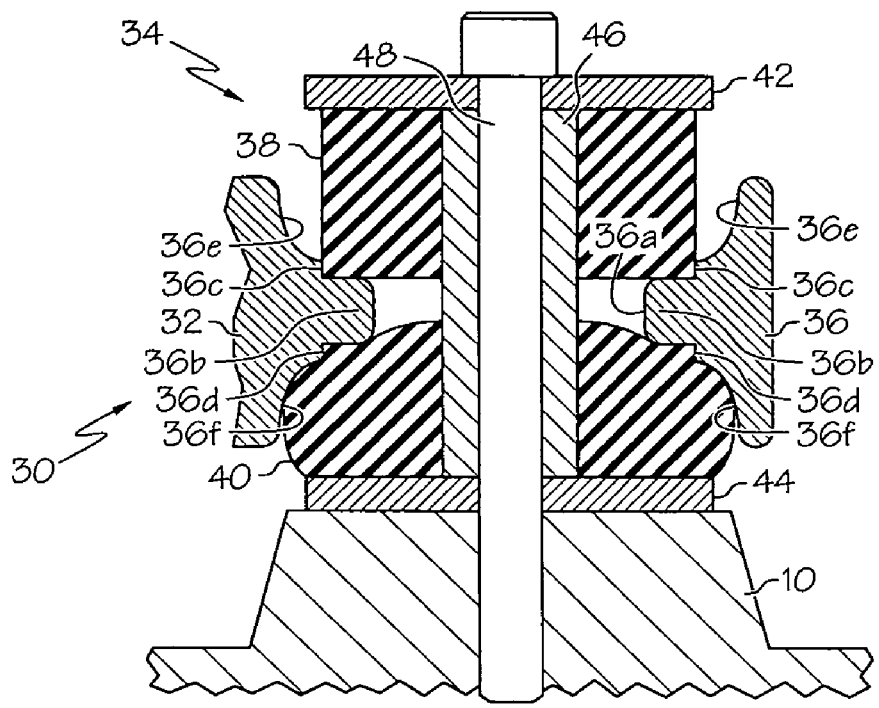
FIG. 3 is a diagram of the mounting apparatus of FIG. 2 when subjected to a z-axis vibrational impulse.

FIG. 3 depicts the mounting apparatus of FIG. 2 when subjected to an outward z-axis (upward in FIG. 3) vibrational movement of the base 10. The force impulse associated with the movement is transmitted to the module 12 via the lower bushing 40 and the flange 36. The elastomeric material of bushing 40 bulges as shown as it absorbs a portion of the vibrational movement. The inboard axial face of the bushing 40 remains in contact with the inboard side of the annulus 36b of flange 36, and its radial periphery increasingly engages the lower cammed surface 36f of flange 36 as the elastomeric material bulges in response to the force. The z-axis force transmitted to module 12 is effectively damped by the relatively large bulk of active bushing material. Moreover, cross-coupling of the force to the transverse plane of flange 36 is minimized because the elastomeric material retains it transverse absorption capability (i.e., it does not collapse or bottom-out as with the prior art mounting apparatus).

Figure 4:
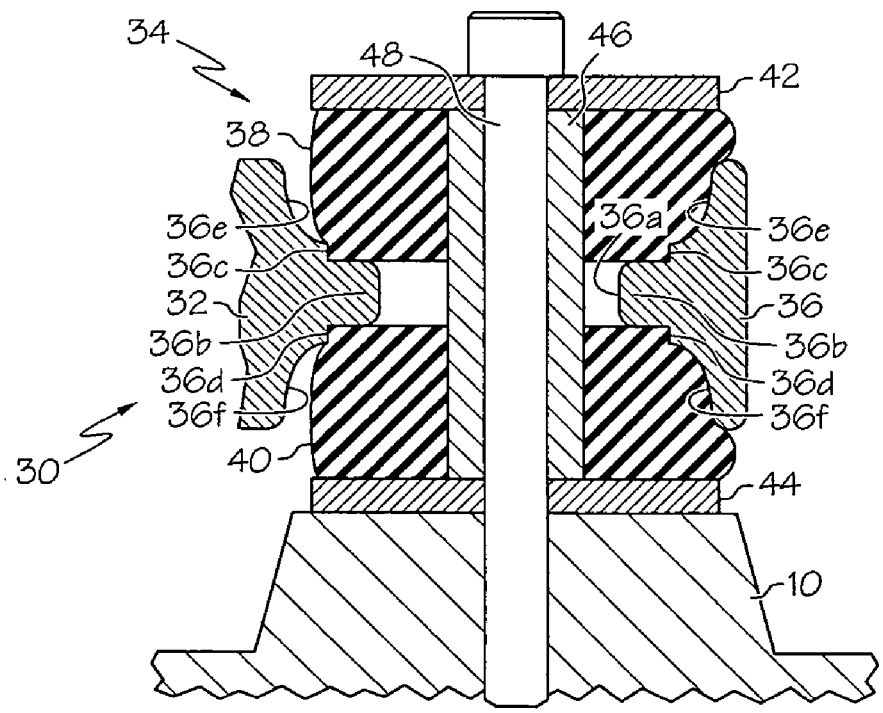
FIG. 4 is a diagram of the mounting apparatus of FIG. 2 when subjected to a transverse-axis vibrational impulse.

FIG. 4 depicts the mounting apparatus of FIG. 2 when subjected to an outward transverse (rightward in FIG. 4) vibrational movement of the base 10. The force impulse associated with the movement is transmitted to the module 12 via flange 36 and the outboard half of upper and lower bushings 38 and 40. The bushings 38 and 40 bulge against the outboard side of the flange 36 as shown as they absorb a portion of the vibrational movement. The radial peripheries of the bushings 38 and 40 remain in contact with the upper and lower shoulders 36c and 36d of flange 36, and increasingly engage the upper and lower cammed surfaces 36e and 36f of flange 36 as the elastomeric material bulges in response to the force. The transverse force transmitted to module 12 is effectively damped by the relatively large bulk of active bushing material. Also, cross-coupling of the force to the z-axis domain is minimized because the elastomeric material retains it transverse absorption capability and does not collapse or bottom-out.

Figure 5:
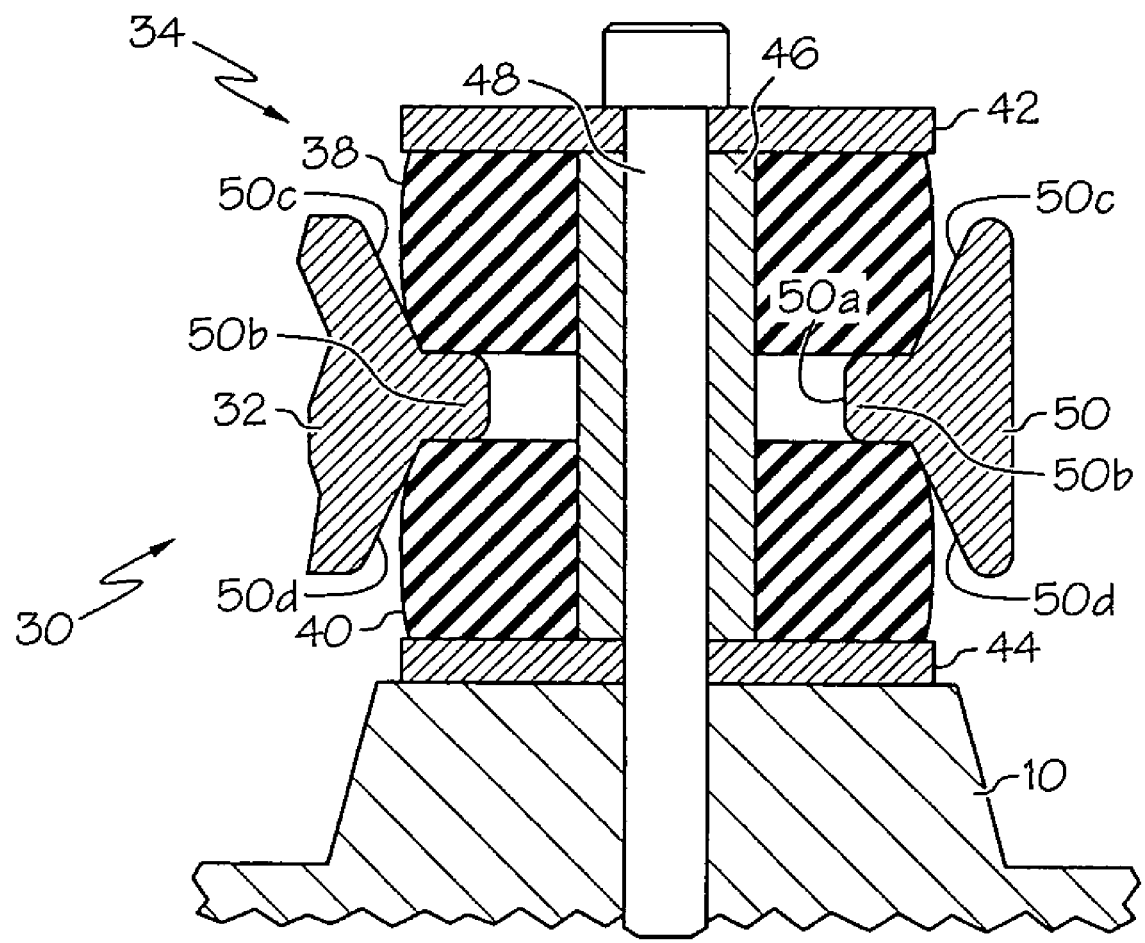
FIG. 5 is a diagram of an alternate mounting arrangement for a vibration-sensitive module according to the present invention.

The profile of the cammed surfaces 36e and 36f can be selected to provide a desired force vs. deflection characteristic for the mounting apparatus 30. The concave profile depicted in the preferred embodiment of FIGS. 2-4 tends to produce a linear force vs. deflection characteristic. FIG. 5 depicts an alternative approach in which a flange 50 having an internal through-hole 50a bordered by an annulus 50b has cammed surfaces 50c and 50d that are linear in profile and slope radially outward from the annulus 50b adjacent the radial peripheries of the upper and lower bushings 38 and 40. Convex flange profiles are also possible.

In summary, the mounting arrangement of the present invention provides a simple way of significantly improving the vibration isolation capability of a bushing assembly without impacting manufacturing or assembly costs. As demonstrated, isolation capability in the transverse plane has been substantially improved, and cross-coupling of force vectors has been greatly diminished by virtually eliminating bottoming-out of bushing material between the flange annulus 36b or 50b and the sleeve 46. While the present invention has been described with respect to the illustrated embodiments, it is recognized that numerous modifications and variations in addition to those mentioned herein will occur to those skilled in the art. For example, the flange shoulders 36c and 36d may be omitted, the flange profiles may be asymmetrical, and so on. Accordingly, it is intended that the invention not be limited to the disclosed embodiment, but that it have the full scope permitted by the language of the following claims.

The invention claimed is:

1. Apparatus for securing a mounting flange of a vibration-sensitive module to a vibrational base with a bushing assembly secured to said vibrational base, where said mounting flange includes an internal through-hole bordered by an annulus, and said bushing assembly includes upper and lower elastomeric bushings disposed above and below said annulus, the improvement wherein:

said upper and lower bushings are cylindrical in profile; and said mounting flange has cammed peripheries disposed radially outboard of said annulus and said upper and lower bushings such that said cammed peripheries are not substantially engaged by said upper and lower elastomeric bushings except in response to a vibrational movement of said base when said elastomeric bushings bulge against said cammed peripheries and increasingly engage said cammed peripheries in relation to a force impulse associated with said vibrational movement.

2. The apparatus of claim 1, wherein said mounting flange includes upper and lower shoulders between said annulus and said cammed peripheries, said upper and lower shoulders being seated against the radial peripheries of said upper and lower bushings for centering said bushing assembly with respect to said flange.

3. The apparatus of claim 1, wherein said cammed peripheries of said mounting flange are concave in profile.

4. The apparatus of claim 1, wherein said cammed peripheries of said mounting flange are convex in profile.

5. The apparatus of claim 1, wherein said cammed peripheries of said mounting flange slope radially outward and are linear in profile.

* * * * *